United States Patent [19]

Yang

[11] Patent Number: 5,257,800
[45] Date of Patent: Nov. 2, 1993

[54] BAGGAGE BARROW

[76] Inventor: Shih-shan Yang, 4Fl., No. 41, Lane 46, Lu Lin Street, Taipei, Taiwan

[21] Appl. No.: 931,257

[22] Filed: Aug. 17, 1992

[51] Int. Cl.⁵ .............................................. B62B 1/12
[52] U.S. Cl. ................................... 280/654; 280/655; 280/47.29
[58] Field of Search ............... 280/645, 652, 654, 655, 280/655.1, 47.18, 47.27, 47.29, 47.315, 47.33, 47.371

[56] References Cited

U.S. PATENT DOCUMENTS

| | | | |
|---|---|---|---|
| 2,605,117 | 7/1952 | Hooz et al. | 280/47.18 X |
| 3,998,476 | 12/1976 | Kazmark, Sr. | 280/655 |
| 4,448,434 | 5/1984 | Anderson | 280/654 X |
| 4,523,773 | 6/1985 | Holtz | 280/654 |
| 4,546,995 | 10/1985 | Kassai | 280/655 |
| 4,754,985 | 7/1988 | Im et al. | 280/47.29 X |
| 4,953,888 | 9/1990 | Stein | 280/654 |
| 4,974,871 | 12/1990 | Mao | 280/655 X |
| 5,024,458 | 6/1991 | Kazmark et al. | 280/655 X |
| 5,127,664 | 7/1992 | Cheng | 280/655 |
| 5,178,404 | 1/1993 | Chen | 280/652 X |

FOREIGN PATENT DOCUMENTS 2345334 10/1977 France .......................... 280/47.27
2040236 8/1980 United Kingdom ............... 280/655

Primary Examiner—Brian Johnson
Attorney, Agent, or Firm—W. Wayne Liauh

[57] ABSTRACT

An improved baggage barrow, of which the retaining handle is mounted on the upper ends of two lower segment rods; the retaining handle is slidably mounted with a movable fastening member; the fastening member has two ball-shaped retainers to mate with two corresponding round holes on the lower segment rods and the upper segment rods so as to fix the upper segment rods when pulled out in place; the baggage barrow can be reduced in size simply by lifting the fastening member to have the ball-shaped retainers disengaged from the round holes of the upper segment rods, and then the upper segment rods can automatically be retracted in the lower segment rods. The stub tube at the lower part of each of the lower segment rods has a bead, which provides a retaining and positioning function upon opening the carriage frame; the baggage barrow is simple in operation, and the barrow can stand steadily without falling down.

2 Claims, 6 Drawing Sheets

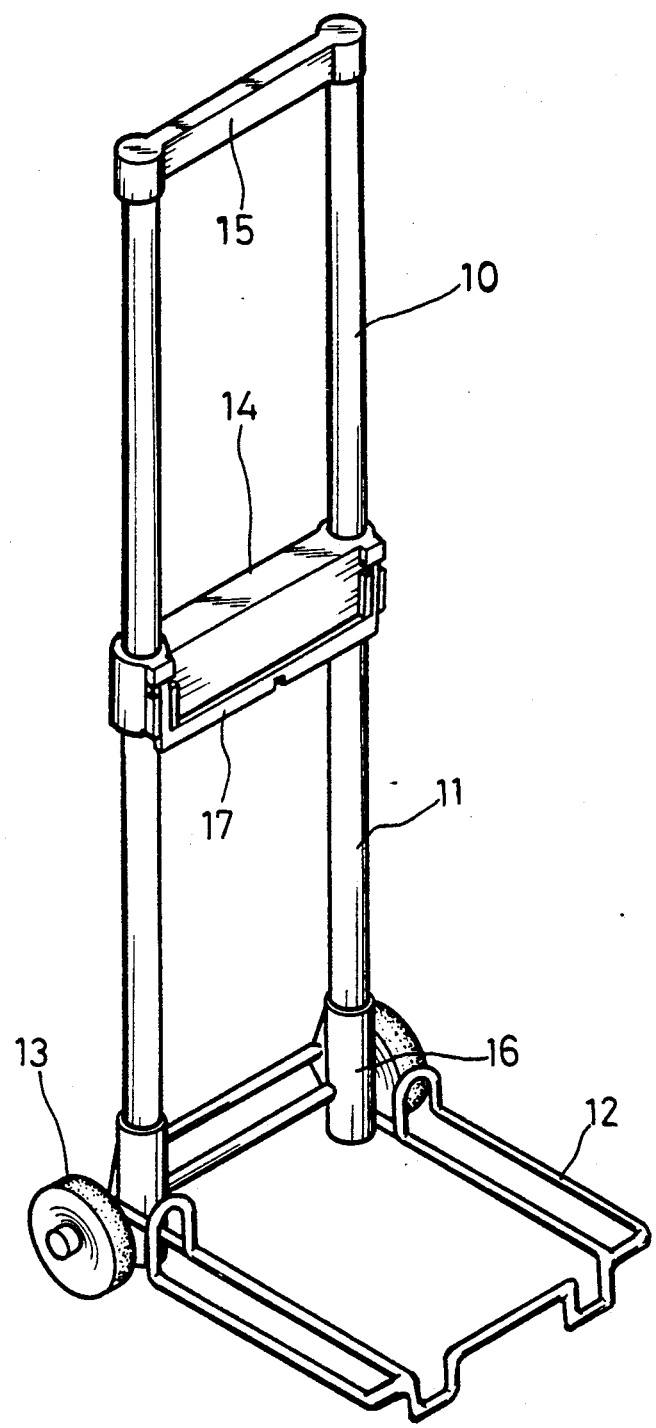
F I G. 2

BAGGAGE BARROW

BACKGROUND OF THE INVENTION

A baggage barrow has widely been used by travelers, since using a barrow to carry baggage may save a lot of manpower. The travelers especially like to use an extensible baggage barrow, which can reduce in size for the convenience of carrying about.

The conventional extensible and foldable baggage barrow (as shown in FIG. 1) usually comprises at least two extensible upper segment rods "A," two lower segment roads "B," a foldable carriage frame "C," at least two castors "D," a movable retaining handle "E," a handle "F" and at least two stub tubes "G." The upper segment rods "A" are connected with the lower segment rods "B" respectively in a retractable manner. The upper segment rods "A" after being pulled out can be set in position by means of two retaining pins (not shown) loaded with two springs inside both ends of the movable retaining handle "E;" then, a user can grip the handle "F" to pull the baggage barrow. When the baggage barrow is not in use, the upper segment rods "A" may be retracted into the lower segment rods "B" by pushing the movable retaining handle downwards to have the retaining pins retracted. The foldable carriage frame "C" and the castors "D" are mounted to the lower end of the lower segment rods by means of the stub tubes "G;" the carriage frame "C" and the lower segment rods "B" may be folded together when the barrow is not in use for the convenience of carriage about.

According to the aforesaid conventional baggage barrow, a user's hand has to push the movable retaining handle "E" downwards before pushing the handle "F" downwards with another hand so as to have the upper segment rods "A" retracted into the lower segment rods "B;" in other words, a user has to use two hands to operate the barrow, and it is deemed inconvenient; moreover, since the movable retaining handle "E" has to move up and down smoothly, there must be a little play between the lower segment rods and the movable retaining handle "E;" as a result, the movable retaining handle "E" and the lower segment rods "B" are unable to be engaged closely; i.e., the movable retaining handle "E" is always in a loose and unstable condition.

Further, the stub tube "G," made of metal, and the carriage frame "C" are assembled together into an assembly, which is susceptible to falling forward when there is no baggage being loaded in the barrow; this is deemed to be another drawback, causing inconvenience to a user.

SUMMARY OF THE INVENTION

This invention relates to an improved baggage barrow, in which the retaining handle is fixedly attached to the upper ends of the lower segment rods; the retaining handle has a movable fastening member, which includes two ball-shaped retainers; by using a spring, the two ball-shaped retainers can be inserted into the round holes on the top part of the lower segment rods and the round holes on lower part of the upper segment rods respectively so as to retain the upper segment rods pulled out in place. To fold up the baggage barrow, a user may lift up the fastening member to have the ball-shaped retainers disengaged from the round holes of the upper segment rods to let the upper segment rods automatically retract into the lower segment rods respectively. The prime feature of the present invention is that the baggage barrow can be retracted into a smaller size with an improved structure by using a simple and easy operation method without affecting the toughness of the barrow structure.

BRIEF DESCRIPTION OF THE DRAWINGS

FIG. 2 is a perspective view of an embodiment according to the present invention.

DETAILED DESCRIPTION

Figure 1:
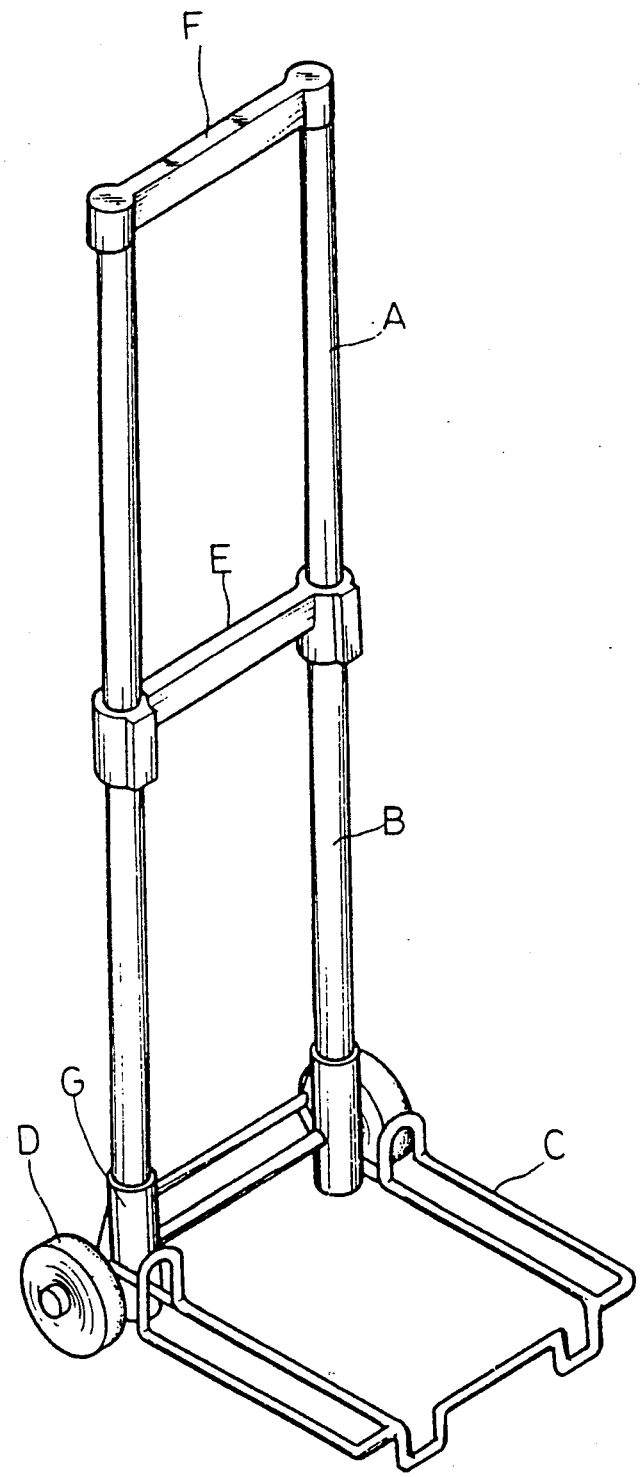
FIG. 1 is a perspective view of a conventional baggage barrow.

Referring to FIG. 2, the embodiment according to the present invention comprises an upper segment rod 10, a bottom segment rod 11, a carriage frame 12, at least two castors 13, a retaining handle 14, a handle 15, a stub tube 16, and a fastening member 17. The handle 15 is fixedly mounted on the top of the two upper segment rods 10, which are extension rods with relation to the lower segment rods 11, respectively. After the upper segment rods 10 are pulled out, the rods 10 will be fixedly retained in place with a fastening member 17 in the retaining handle 14. The lower end of each lower segment rod 11 is connected with the stub tube 16 made of metal (or other materials), the carriage frame 12 and the castors 13.

Figure 3:
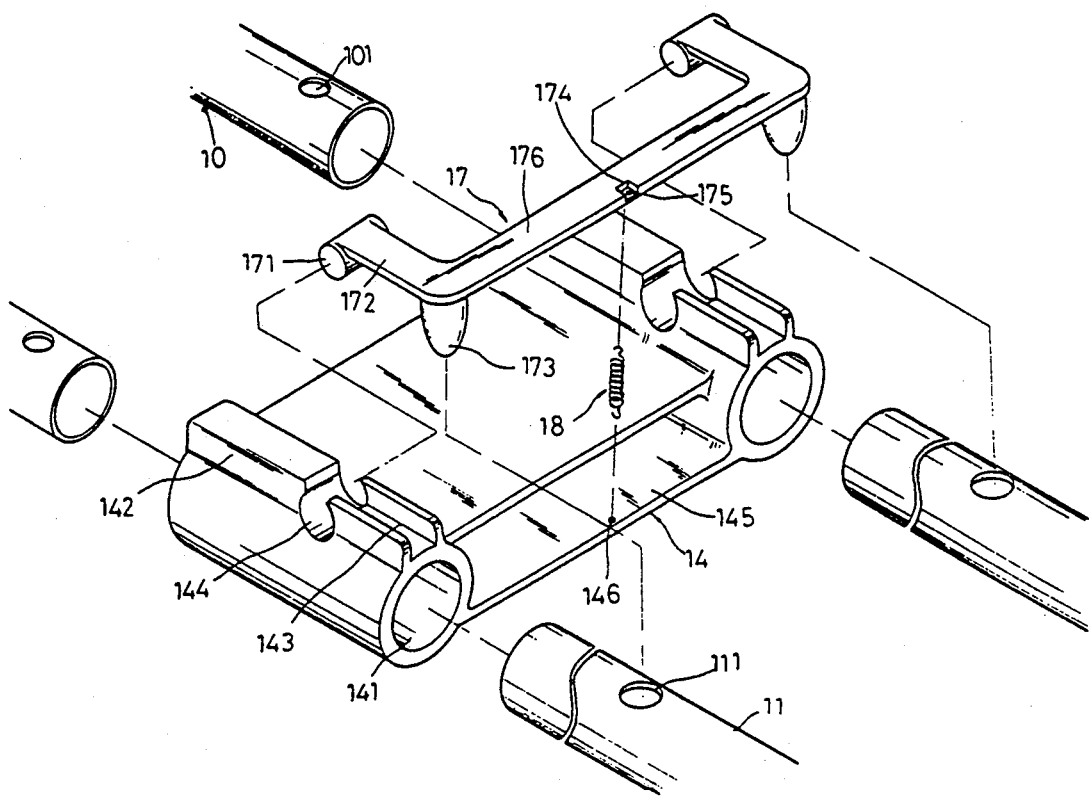
FIG. 3 is a disassembled view of a fastening member in the present invention.
Figure 4:
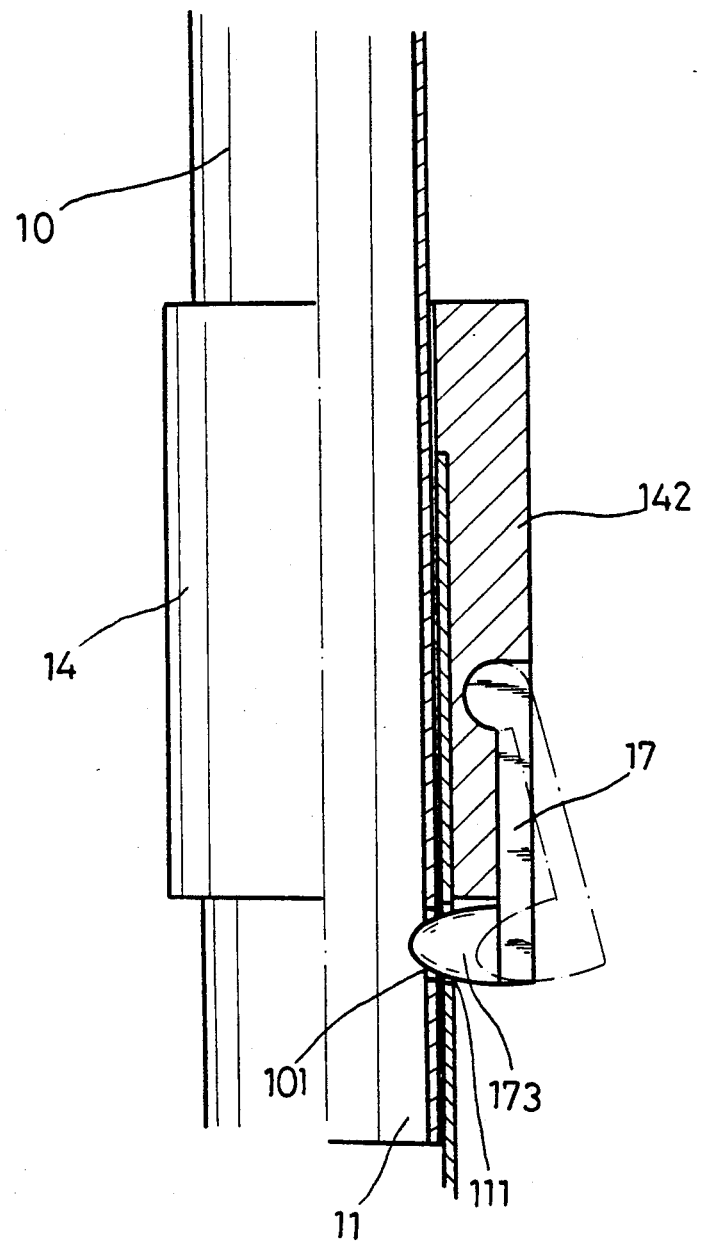
FIG. 4 is a fragmental section view of the fastening member according to the present invention.

Referring to FIGS. 3 and 4, the present invention is illustrated with a perspective view and a sectional view respectively; the retaining handle 14 is similar to a rectangular member with two sleeves 141 on the both sides thereof. The inner diameter of the lower sleeve 141 is approximately equal to the outer diameter of the lower segment rod 11 so as to facilitate the sleeve 141 to become fixedly connected with the upper end of the lower segment rod 11; the sleeve may also be fixed in place by using a screw or glue. The inner diameter of the upper end of the sleeve 141 is slightly larger than the outer diameter of the upper segment rod 10 so as to facilitate the upper segment rod 10 to move back and forth freely out of the lower segment rod 11.

The front side of the sleeve 141 is formed into a rectangular base 142, while the lower half part of the base 142 is formed into a U-shaped channel 143, which is perpendicular to and in communication with a round groove 144. The fastening member 17 is a U-shaped member, of which the two side plates 172 each has a cylindrical end 171 to be mated with a round groove 144. When the two cylindrical ends 171 are mounted in the two round grooves 144 respectively, the two side plates 172 can also be fitted into the two U-shaped channels 143 respectively, since the width of the side plate 172 is slightly smaller than that of the U-shaped channel 143 so as to maintain a play therebetween. The lower end of each side plate 172 has a ball-shaped retainer 173, and each of the retainers 173 is to be mated with a round hole 111 on one of the lower segment rods 11; the outer diameter of the retainer 173 is slightly smaller than that of the inner diameter of the round hole 111, so as to have the retainer 173 fitted into the round hole 111 smoothly. The lower front side of the fastening member 17 has one square groove 174 on each side thereof. The mid part of the fastening member 17 has a small hole 175 to be hooked with one end of a spring 18, of which the other end is hooked in a small hole 146 on the mid-part of the rear board 145 of the retaining handle 14 so as to facilitate the ball-shaped retainers 173 of the fastening member 17 to engage with the corresponding round holes 111 by using the end cylinders 171 as a fulcrum. The upper segment rods 10 are to be inserted into the lower segment rods 11 respectively in a retractable manner. The lower end of each upper segment rod 10 has a round hole 101 which corresponds to a round hole 111 on each corresponding lower segment rod 11. When the upper segment rods 10 are pulled out to such an extent that the round holes 101 thereof are superimposed with the round holes 111 on the lower segment rods 11 respectively, the ball-shaped retainers 173 will be inserted into the superimposed round holes 111 and 101 respectively, to have the upper segment rods 10 retained in place. Upon the upper segment rods being retracted, the front plate 176 is raised to disengage the ball-shaped retainers 173 from the round holes 101 of the upper segment rods 10, and then the upper segment rods 10 will slide downwards into the lower segment rods 11 respectively. As soon as the fastening member 17 is raised, the upper segment rods 10 will automatically retract in place as a result of the ball-shaped retainers 173 being disengaged from the round holes 101, i.e., the present invention does not have the drawbacks of a conventional baggage barrow, which uses a spring to hold the retainer in place, and a user has to press the spring with the manual force of two hands. In the present invention, the fastening member 17 is a detachable assembly to simplify the assembly procedures. Since the retaining handle 14 and the lower segment rods 11 are fixedly connected together, there is no play left between them; in other words, the structure thereof is strong and tough.

Figure 5:
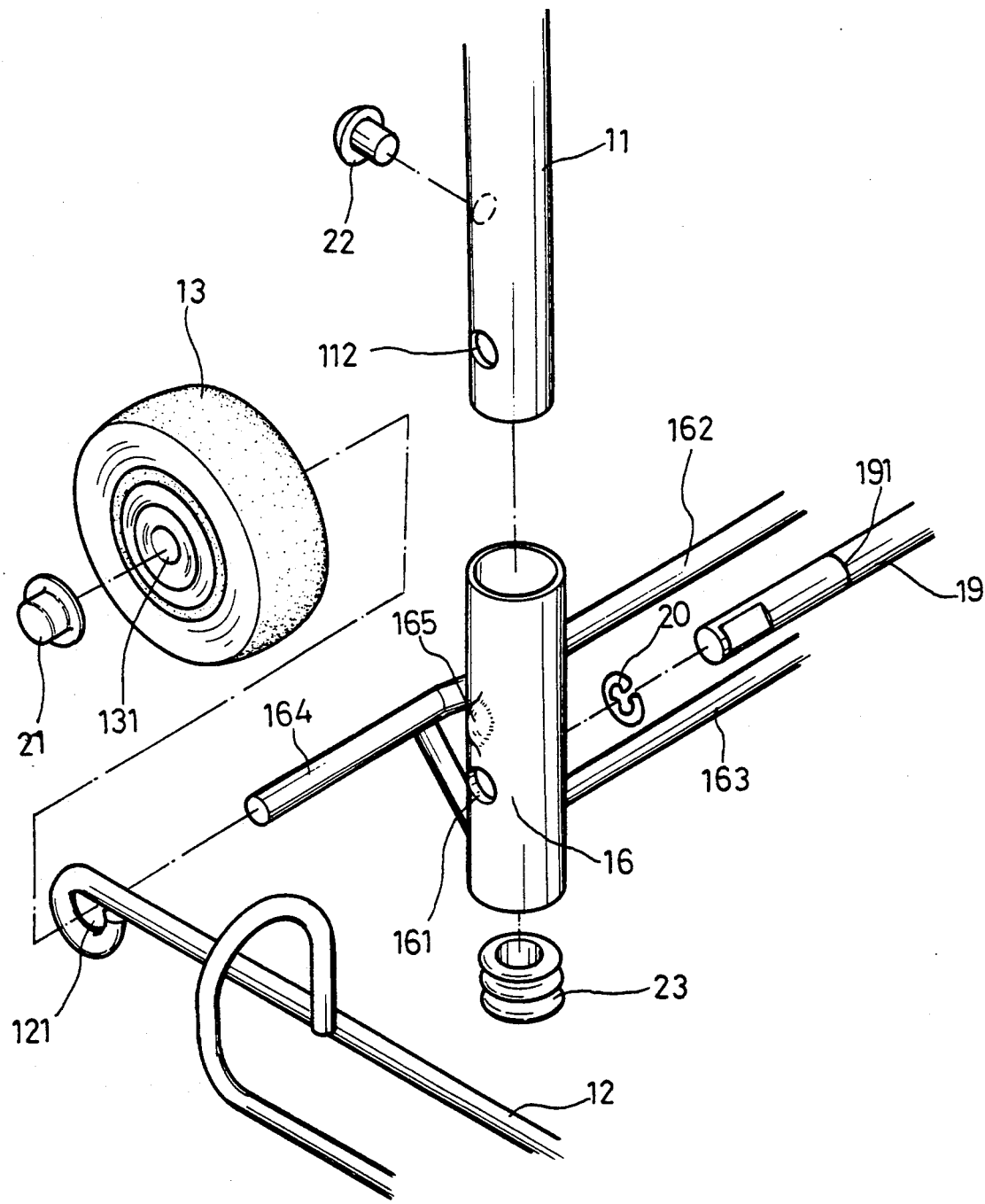
FIG. 5 is a disassembled view of the stub tube assembly of the present invention.
Figure 6:
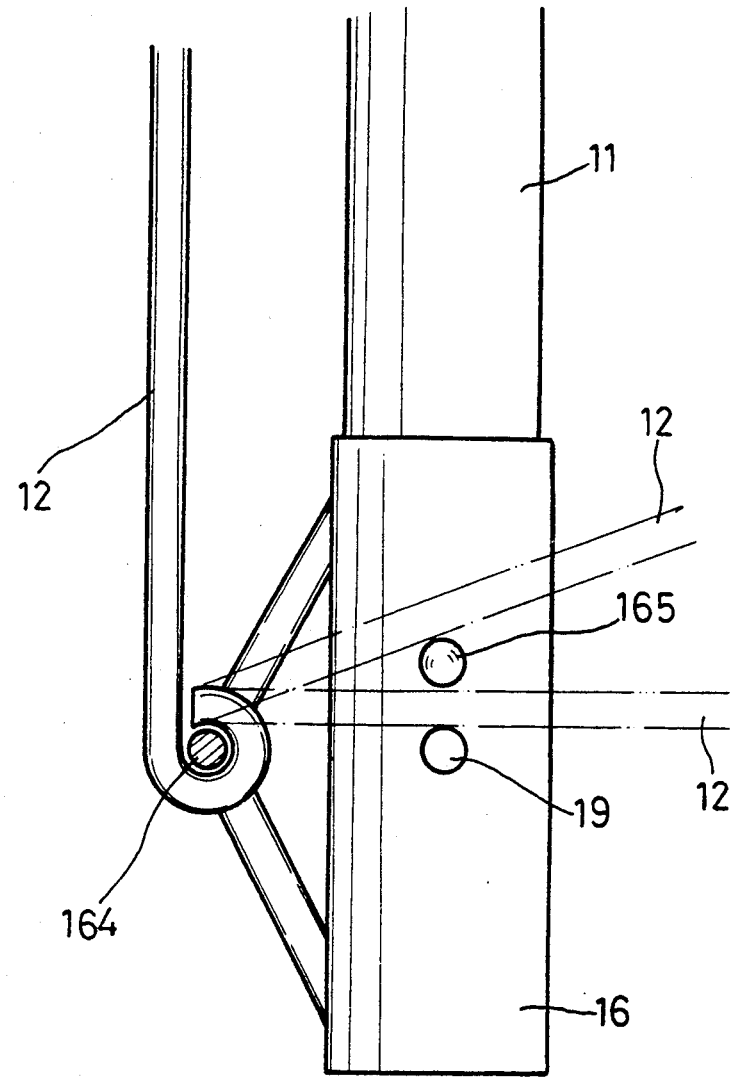
FIG. 6 illustrates a side view of the stub tube assembly of the present invention upon being operated.

Referring to FIG. 5, the two stub tubes 16 and the auxiliary parts are the same on each side, and therefore only one of them is described as follows : the stub tube 16 is a hollow cylinder to receive the lower end of one lower segment rod 11; a lateral rod 19 is mounted through a round hole 161 of the stub tube 16 and a round hole 112 of the lower segment rod 11 so as to have the lower segment rod 11 and the stub tube 16 connected together and to fix them together with a rivet 22; a C-shaped retaining ring 20 is mounted around a groove 191 on the lateral rod 19. The outer end of the lateral rod 19 extends out of the stub tube 16, and is then pressed into a slight flat shape to prevent the lateral rod 19 from slipping laterally, i.e., to hold the rod 19 in place. The back side of the stub tube 16 is welded with two lateral rods 162 and 163 to form a frame. The rod 162 has two extended shafts 164 on both ends thereof, and they are used for mounting a connecting ring 121 of a carriage frame 12 and the shaft hole 131 of a castor 13; a cap 21 is fixedly mounted to the extended shaft 164 so as to fix the carriage frame 12 and the castor 13 in place. The lower end of the stub tube 16 receives an inner sleeve 23 for sealing up the lower end of the stub tube. The prime feature of the present invention is that a bead 165 is furnished on the outer side of the stub tube 16; the bead 165 may be formed by punching out from the inner surface of the stub tube (or being formed by using a rivet mounted above the round hole 161). When the lower segment rods 11 and the carriage frame 12 are opened so as to set at a right angle to each other, the carriage frame 12 will encounter a resistance upon nearing the bead 165; in that case, the user has to apply a pressure to the carriage frame 12 to let the same pass over the bead 165 (since the carriage frame 12, the stub tube 16 and the bead 165 are all made of a flexible metal, the carriage frame 12 can easily pass over the bead 165), i.e., the carriage frame 12 will be set at a point between the bead 165 and the lateral rod 19 (as shown in FIG. 6). By means of the beads 165, the segment rods can be set vertically without falling completely forward and downward.

I claim:

1. An improved baggage barrow comprising at least two upper segment rods, at least two lower segment rods, a carriage frame, at least two castors, a retaining handle, a handle, two stub tubes and a fastening member; said handle being fixedly attached to said tow upper segment rods which are extensible out of said lower segment rods respectively; the lower rods of said tow lower segment rods being mounted with said carriage frame and said castors by means of said two stub tubes; opposite sides of said retaining handle each having a sleeve mounted around an upper end of said lower segment rod; a front side of each said sleeve having a rectangular base, a U-shaped channel and a round groove which is perpendicular to and in communication with said U-shaped channel; a U-shaped fastening member having two side plates with an integral end cylinder, each mated with one of said round grooves on said sleeve of said retaining handle, said two side plates to mate with said two U-shaped channels respectively; each said side plate of said fastening member having an integral ball-shaped retainer to mate with a round hole on said lower segment rod; a lower end of each said upper segment rod having a round hole, wherein as said upper segment rod is pulled out completely, said ball-shaped retainers are engaged with said round holes on said lower segment rods and said upper segment rods as a result of a spring providing a pulling force applied between said fastening member and said retaining handle, so as to fix said segment rods in place respectively; wherein when said fastening member is lifted up about said end cylinders as a fulcrum, said ball-shaped retainers are disengaged and said upper segment rods are able to slide into said lower segment rods respectively.

2. An improved baggage barrow as claimed in claim 1, wherein each said stub tube is a hollow cylinder to receive the lower end of one of said lower segment rods; a lateral rod being inserted through a round hole of said stub tube and a round hole in the lower end of said lower segment rod; a rivet and a C-shaped retaining ring engaged with the lateral rod for fixing said lateral rod in place; a back side of said stub tube being welded with a lateral frame assembly having an extended shaft to insert through a connecting rod of said carriage frame and one of said castors, characterized in that an outer side of said stub tube having a bead above said round hole for receiving said lateral rod, and said bead being used for keeping said carriage frame positioned between said bead and said lateral rod upon said carriage frame and said lower segment rods being opened at an angle of 90 degrees.

* * * * *